Sept. 6, 1927.
R. W. SCHROEDER
1,641,295
FUEL CONSUMPTION INDICATOR
Filed July 16, 1921
2 Sheets-Sheet 1
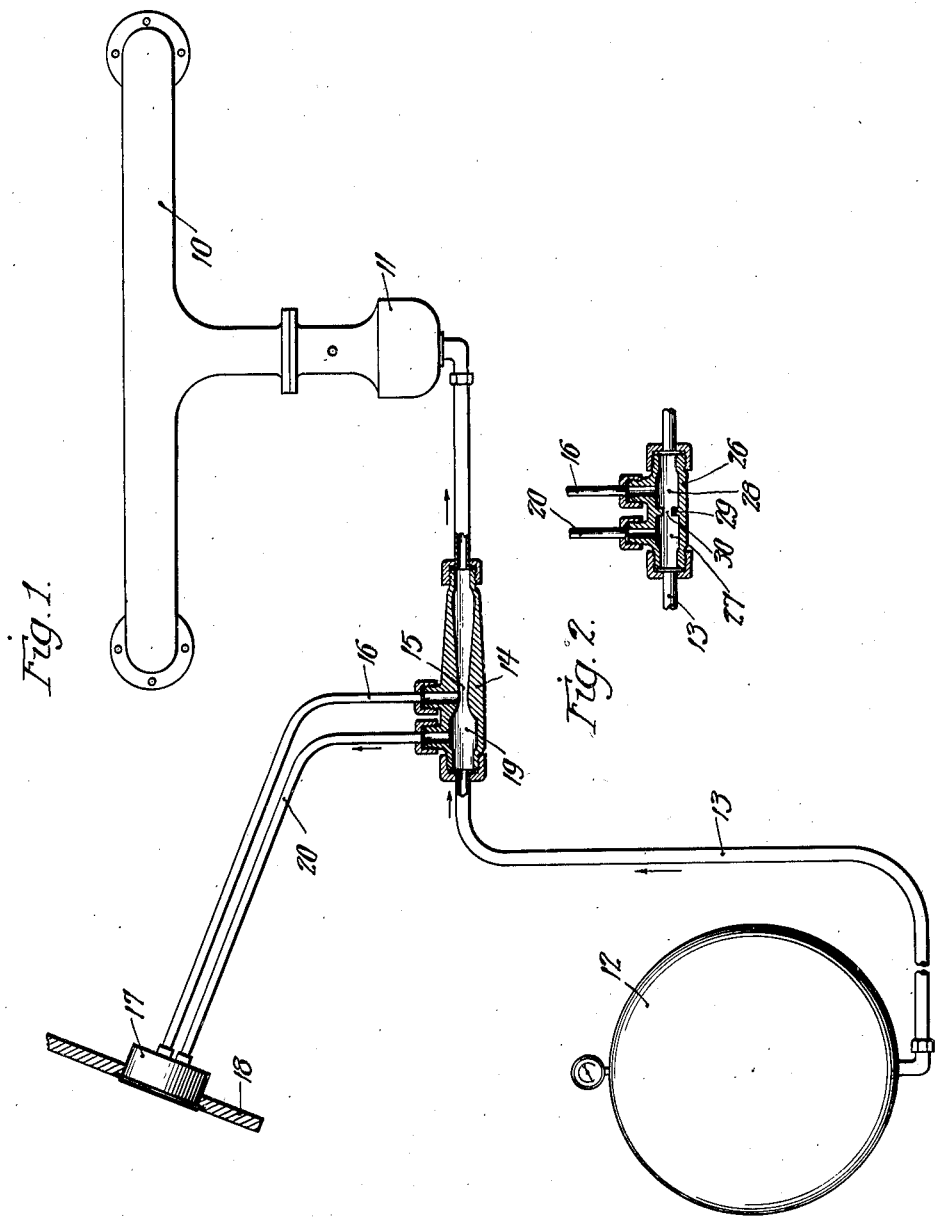

Sept. 6, 1927.  1,641,295

R. W. SCHROEDER

FUEL CONSUMPTION INDICATOR

Filed July 16, 1921  2 Sheets-Sheet 2

Inventor
Rudolph W. Schroeder
By: Nissen & Crane Attys

Patented Sept. 6, 1927.

1,641,295

UNITED STATES PATENT OFFICE.

RUDOLPH W. SCHROEDER, OF CHICAGO, ILLINOIS.

FUEL-CONSUMPTION INDICATOR.

Application filed July 16, 1921. Serial No. 485,280.

This invention relates to mechanism for indicating the rate of fuel consumption for gasoline engines for automobiles and other liquid burning engines, and has for its object the provision of indicating mechanism of the class named which shall be of improved construction and operation.

The invention is exemplified in the combination and arrangement of parts shown in the accompanying drawings and described in the following specification, and it is more particularly pointed out in the appended claims.

In the drawings—

Fig. 1 is a diagrammatic view of an installation embodying one form of the present invention applied to a motor vehicle;

Fig. 2 is a modified form of orifice used in connection with the invention;

Figure 3:
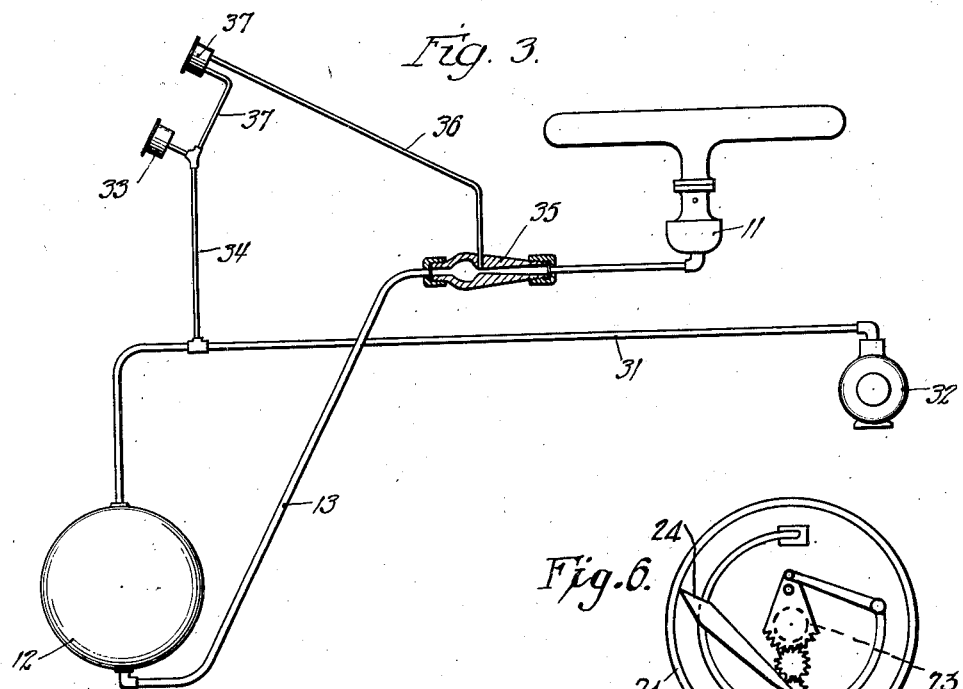
Fig. 3 shows a slightly different form of installation.
Figure 6:
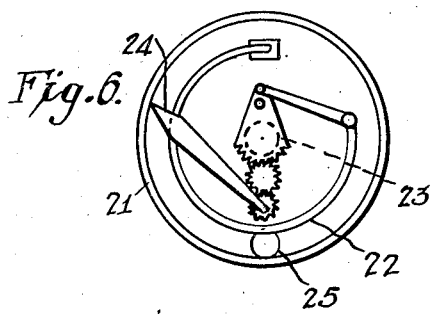
Fig. 6 is a front sectional view of the instrument shown in Figs. 4 and 5.

In Fig. 1, the numeral 10 designates the intake manifold of an internal combustion engine to which is attached a carbureter 11 for supplying fuel thereto. The fuel for the engine is stored in a tank 12 in the upper portion of which compressed air or other gas is supplied for raising the fuel to the carbureter, the arrangement constituting the well-known force feed system used on a number of automobiles and other power driven devices. A pipe line 13 leads from the tank 12 to the carbureter 11, and in the present invention a fitting 14 is inserted in the pipe line 13 and is provided with a restricted orifice 15. The fitting 14 constitutes a Venturi tube which may be of any well-known construction, and a pipe 16 leads from the orifice 15 to an instrument 17 mounted on the dashboard 18 of an automobile. The chamber 19 in the rear of the orifice 15 is connected through a pipe 20 to the instrument 17.

Figure 4:
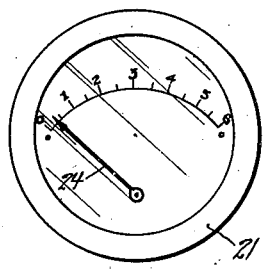
Fig. 4 is a front view of the indicating instrument.
Figure 5:
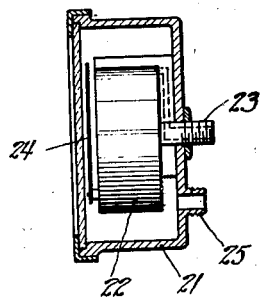
Fig. 5 is a vertical section of the instrument shown in Fig. 4.

The instrument 17 may be any well-known form of pressure gage for measuring differential pressures. One form is shown in Figs. 4 and 5 in which the case 21 is tightly closed against gaseous pressures and contains pressure actuated mechanism 22 which may be in the form of a curved tube, the interior of which is connected through a fitting 23 to the source of pressure to be indicated. The tube 22 is connected with a pointer 24 through suitable gearing and levers so that the expansion of the tube under the gas pressure moves the pointer to indicate the difference in pressure between the interior of the tube and the interior of the casing 21. The instrument is the well-known form of gage used for indicating steam pressure in connection with steam boilers and other apparatus.

In the installation shown in Fig. 1 the tube 20 is connected with the interior of the tube 22, and the tube 16 is connected to the interior of the case 21 through the fitting 25. By this arrangement the interior of the tube 22 will be subjected to the pressure in the chamber 19 of the Venturi tube, while the interior of the case 21 will be subjected to the reduced pressure of the orifice 15 so that the reading indicated by the needle 24 will be proportional to the differential pressure between the chamber 19 and the orifice 15. This differential pressure will be proportional to the rate of flow of fluid through the pipe 13 to the engine and consequently the instrument may be calibrated to measure rate of flow directly, as in gallons per hour. The front of the instrument so calibrated is shown in Fig. 4, the scale being arranged to measure rates of flow varying from zero to six gallons per hour.

Instead of the Venturi tube shown in Fig. 1, the form of orifice shown in Fig. 2 may be employed in which the fitting 26 is provided with two chambers 27 and 28 separated by a wall 29 having an opening or orifice 30 therethrough. The pipes 20 and 16 connect with the chambers 27 and 28, respectively. The action is similar to that of the Venturi tube shown in Fig. 1.

In the form of the invention shown in Fig. 3, the compression tank 12 is connected to the carbureter 11 in the same manner as described in connection with Fig. 1, but the upper portion of the tank is connected through a pipe 31 to a pump 32 by which air under pressure is supplied to the compression tank. In installations of this kind it is usual to provide a pressure indicator 33 mounted on the dashboard of the car and connected with the line 31 by a pipe 34 to show at all times the pressure in the tank 12. The Venturi tube 35 is inserted in the pipe 13, but in this case a single connection 36 leads from the tube to the rate of flow indicator 37. The instrument 37 is of the same character as that shown in Fig. 5, and the tube 36 is connected to the operating tube 22 of the instrument. The interior of the casing is connected by a pipe 38 through the pipe 34 to the pipe line 31 and the top of the storage tank 12. In this case it will be seen that the pressure will be greater in the interior of the case 21 than it is in the actuating tube 22, and since the interior of the case is connected with the upper part of the tank 12 there will be no gasoline in the interior of the instrument case. In this case increase of differential pressure will tend to contract the tube 22 instead of expanding it as in the other case so that the connection between the pointer 24 and the tube will have to be altered or the scale readings on the face of the instrument will have to be reversed. Any well-known mechanical expedient may be used in connection with the needle 24 to reverse its direction of movement and cause it to read from left to right as in the previous case.

I claim:—

1. The combination with a liquid fuel burning engine, of means for supplying fuel to said engine comprising a compression tank, and a conduit for conducting fuel from said tank to said engine, a fitting having a restricted orifice therein arranged in said conduit to create a differential pressure incident to flow of liquid from said tank to said engine, an instrument having an expansible member therein and having a closed case surrounding said member, and means for connecting said expansible member and said case with said fuel supplying means to subject said member and case respectively to the differential pressure in said fuel supplying means.

2. The combination with an internal combustion engine, of means for supplying liquid fuel thereto, means forming a part of said liquid supplying means for producing a pressure difference in the liquid in said supplying means incident to flow of liquid therein, a pressure gage adapted to register pressure differences and conduits connecting said pressure gauge with different portions of said liquid supplying means having different pressures therein to cause said gauge to be actuated by said pressure differences for indicating the rate of flow of fuel to said engine.

3. The combination with an internal combustion engine, of a compression tank and conduit for supplying fuel thereto, a device having a restricted orifice therein arranged in said conduit, a pressure gage having compartments, means for connecting one of said compartments with said supply tank to subject said compartment to the pressure of said tank, and means for connecting the other of said compartments with said orificed device to cause said instrument to indicate the rate of flow of fuel to said engine incident to the differential pressures to which said instrument is subjected.

4. The combination with an internal combustion engine, of a pressure tank and conduit for supplying fuel thereto, means for supplying compressed gas to the upper portion of said tank, a device having a restricted orifice therein arranged in said conduit, an instrument having a closed case and an expansible member therein, means for connecting the interior of the case of said instrument with the upper portion of said compression tank, and means for connecting the expansible member of said instrument with said orificed device so that said expansible member will be subjected to the reduced pressure due to said orifice, said instrument being calibrated to indicate the rate of flow of fuel from said tank to said engine incident to the differential pressure to which it is subjected.

In testimony whereof I have signed my name to this specification on this 7th day of July, A. D. 1921.

RUDOLPH W. SCHROEDER.